United States Patent
Hillo

(10) Patent No.: US 7,712,602 B2
(45) Date of Patent: May 11, 2010

(54) METHOD FOR USE IN A CONVEYOR AND A CONVEYOR

(75) Inventor: Mauri Hillo, Hikiä (FI)

(73) Assignee: Metso Paper, Inc., Helsinki (FI)

( * ) Notice: Subject to any disclaimer, the term of this patent is extended or adjusted under 35 U.S.C. 154(b) by 7 days.

(21) Appl. No.: 10/538,029

(22) PCT Filed: Jan. 9, 2004

(86) PCT No.: PCT/FI2004/000012

§ 371 (c)(1),
(2), (4) Date: Jun. 8, 2005

(87) PCT Pub. No.: WO2004/063068

PCT Pub. Date: Jul. 29, 2004

(65) Prior Publication Data

US 2006/0054462 A1 Mar. 16, 2006

(30) Foreign Application Priority Data

Jan. 10, 2003 (FI) .................................. 20030042

(51) Int. Cl.
  B65G 15/24 (2006.01)
  B65G 17/26 (2006.01)
  B65G 47/26 (2006.01)
  B65G 47/10 (2006.01)
  B65G 47/46 (2006.01)

(52) U.S. Cl. .................... 198/607; 198/418; 198/370.09

(58) Field of Classification Search .............. 198/418.7, 198/418.8, 418.9, 419.1, 370.01, 370.08, 198/440, 459.5, 463.3, 469.1, 633, 801, 607, 198/750.14, 750.2

See application file for complete search history.

(56) References Cited

U.S. PATENT DOCUMENTS

| 3,447,227 | A | | 6/1969 | Wollman | |
|---|---|---|---|---|---|
| 3,728,772 | A | | 4/1973 | Coffman | |
| 4,847,969 | A | | 7/1989 | Walker | |
| 5,060,780 | A | * | 10/1991 | Santandrea et al. | 198/345.1 |
| 5,341,911 | A | * | 8/1994 | Gamberini et al. | 198/409 |
| 5,655,425 | A | * | 8/1997 | Ruohio et al. | 83/27 |
| 5,743,375 | A | * | 4/1998 | Shyr et al. | 198/463.3 |
| 5,996,769 | A | * | 12/1999 | Winchip | 198/626.4 |
| 6,058,587 | A | | 5/2000 | Smallwood | |
| 6,152,286 | A | * | 11/2000 | Pienta | 198/459.6 |
| 6,595,349 | B2 | * | 7/2003 | MacSwan | 198/607 |
| 6,763,927 | B2 | * | 7/2004 | Itoh et al. | 198/370.1 |

FOREIGN PATENT DOCUMENTS

WO WO 99/29480 6/1999
WO WO 99/52800 10/1999

* cited by examiner

*Primary Examiner*—Gene Crawford
*Assistant Examiner*—Ramya Prakasam
(74) *Attorney, Agent, or Firm*—Cohen Pontani Lieberman & Pavane LLP

(57) ABSTRACT

The invention relates to a method for separating the web rolls (2) of a roll set (1) traveling on a conveyor (3) from each other. The conveyor (3) comprises a conveyor belt or chain (12) adapted to run about driving and tail pulleys (7). In the method, the set (1) of web rolls is transported on the leg of the conveyor belt or chain (12). According to the method, onto the top surface of the conveyor belt or chain (12) is formed an elevation capable of separating the web rolls (2) apart from each other with the help of an elevating roll assembly (5) adapted to operate below the top surface of the conveyor belt or chain (12) and comprising at least one rotary elevating roll (6).

31 Claims, 3 Drawing Sheets

US 7,712,602 B2

METHOD FOR USE IN A CONVEYOR AND A CONVEYOR

PRIORITY CLAIM

This is a national stage of PCT application No. PCT/FI2004/000012, filed on Jan. 9, 2004. Priority is claimed on Application No. 20030042, filed in Finland on Jan. 10, 2003.

BACKGROUND OF THE INVENTION

The present invention relates to a method for separating web rolls on a conveyor from each other.

The invention also relates to a roll conveyor suited for implementing the method.

Web rolls manufactured on a paper or paperboard machine are slit at a slitter-winder from a wide machine roll into rolls of narrower width according to customer order. Slitter-winders fall into two main types: shaft-supported slitter-winders, in which the slit rolls are delivered from the slitter in two different sets to both sides of the winder, and surface-driven slitter-winders, in which the slit rolls are delivered as a complete set. Since surface-driven belt-supported slitter-winders are based on the same principle as surface-driven roller-supported slitter-winders, in a general sense it is appropriate in this context to assign the term "surface driven slitter-winder" to any winder-slitter capable of delivering the rolls as a complete set.

Rolls manufactured on a surface-driven slitter-winder must be separated from each other for such reasons as, e.g., quality checks, before the slit rolls can be transferred further to a labeling and packaging station. Conventionally, the rolls of a roll set delivered by the slitter-winder are separated from each other at a transition point between two roll conveyor sections. When the separation point between the first and second roll of a roll set coincides with the transition point between the conveyor sections, the first conveyor is stopped, whereby the first roll of the set continues its travel on the second conveyor, while the other rolls of the set remain on the first conveyor. Subsequently, the separation point between the second and third roll is driven to the transition point between the conveyor sections, whereupon the first conveyor is stopped causing the second roll to continue its travel on the second conveyor, while the other rolls of the set remain on the first conveyor. The same sequence is repeated until all of the rolls of the set are separated from each other.

The rolls of a set received from a slitter-winder may stay adhered to each other due to different reasons: the core ends are not flush with the web roll ends, the sheet edges of the rolls are slit uneven leaving them interleaved with each other or slitting has been started too late whereby the core still has some layers unslit. If the rolls adhere to each other, problems may occur at the transition point between the conveyors in the case that the rolls fail to separate. To avoid such complications, full separation of rolls must be checked in a set received from a surface-driven slitter-winder. While checking the separation of rolls in a set may occur at any place along the transfer of the roll set, generally the check is performed through arching the roll set by way of elevating the middle rolls of the roll set upward so much that the roll ends separate from each other leaving a gap therebetween. At this moment, the operator checks visually that all rolls are separated from each other and, if necessary, uses a wedge to force apart any rolls adhering to each other. Although modern slitter-winders are extensively automated, monitoring the rolls in a roll set and separation of the rolls from each other in operation is still being performed manually. These worksteps prevent running a slitter-winder with lesser manpower. In addition to being monotonous and tedious, such operator tasks may be even hazardous if carried out counter to instructions or by negligence. Sufficient time must also be reserved for the operator's actions to permit his checks on the roll set to be performed safely. Due to the manual separation of rolls, the operation of the slitter-winder and the roll conveyor system is slowed down.

SUMMARY OF THE INVENTION

It is an object of the present invention to provide a novel method for separating rolls of a roll set received from a slitter-winder apart from each other without the need for mechanical intervention by the operator. It is a further object of the invention to provide a conveyor capable of implementing the method.

The goal of the invention is attained by virtue of separating the rolls of a roll set resting on a conveyor with the help of an elevating roll assembly that is situated under the conveyor chain or belt and comprises at least one freely rotating elevating roll. The elevating roll assembly forms on the top surface of the conveyor chain or belt an elevation directed upward. As the rolls travel over the elevation, the end-to-end abutting web rolls of the roll set are deflected in regard to each other, whereby any adhering rolls are separated from each other. The separating effect is augmented by the forces generated by the small speed difference between the web roll lifted onto the elevation and those traveling on the base level of the conveyor belt or chain. Additionally, the shape of the conveyor chain slats and/or elevating rolls puts the conveyor chain or belt into a reciprocating up and down motion that detaches the adhering web rolls from each other.

The invention provides significant benefits.

Now automated separation of web rolls in a set becomes possible thus reducing the number of mechanical and tedious operations the personnel have to perform in a close vicinity of the rolls. Additionally, the operation of the slitter-winder as well as the roll conveyor system is accelerated, since the system need not be stopped for separating the rolls of a set. The embodiment according to the invention also has a simple construction that can be readily installed on existing roll conveyor layouts.

BRIEF DESCRIPTION OF THE DRAWINGS

In the following, the invention is examined in more detail with the help of the appended drawings.

DETAILED DESCRIPTION OF THE PRESENTLY PREFERRED EMBODIMENTS

Figure 1:
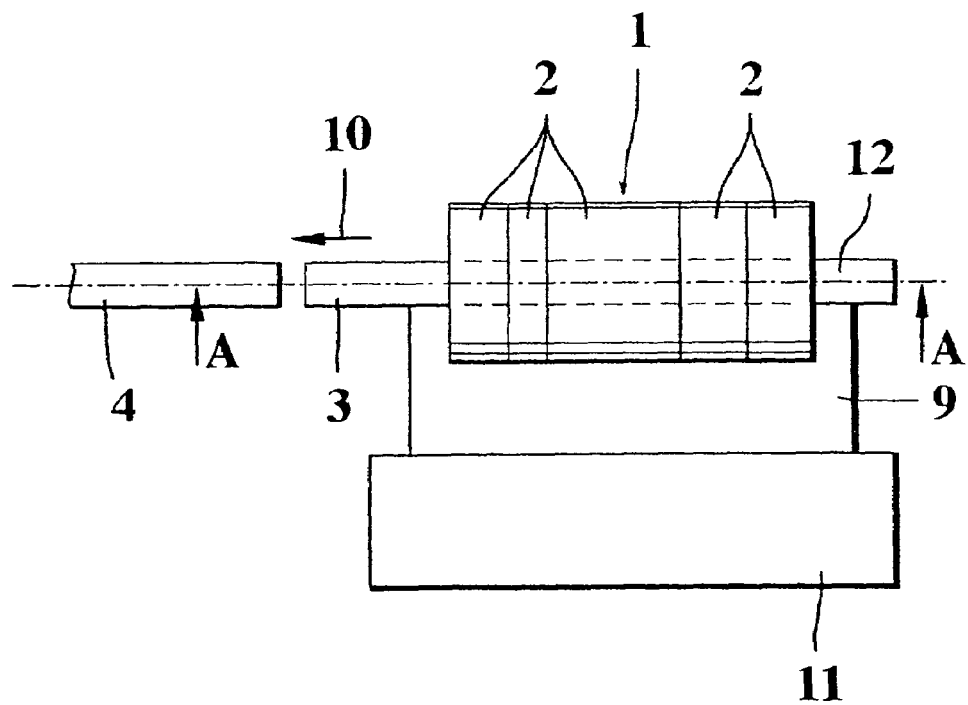
FIG. 1 is a top view of a set of web rolls received onto a roll conveyor from a slitter-winder.
Figure 6:
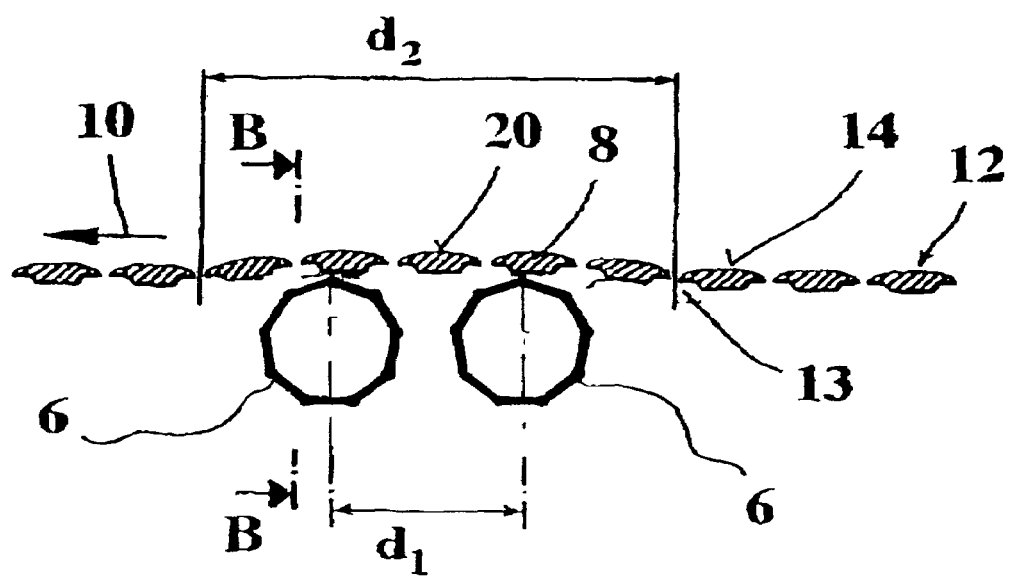
FIG. 6 is a partially enlarged view similar to FIG. 3, showing another embodiment of the elevating conveyor roll assembly.
Figure 2:
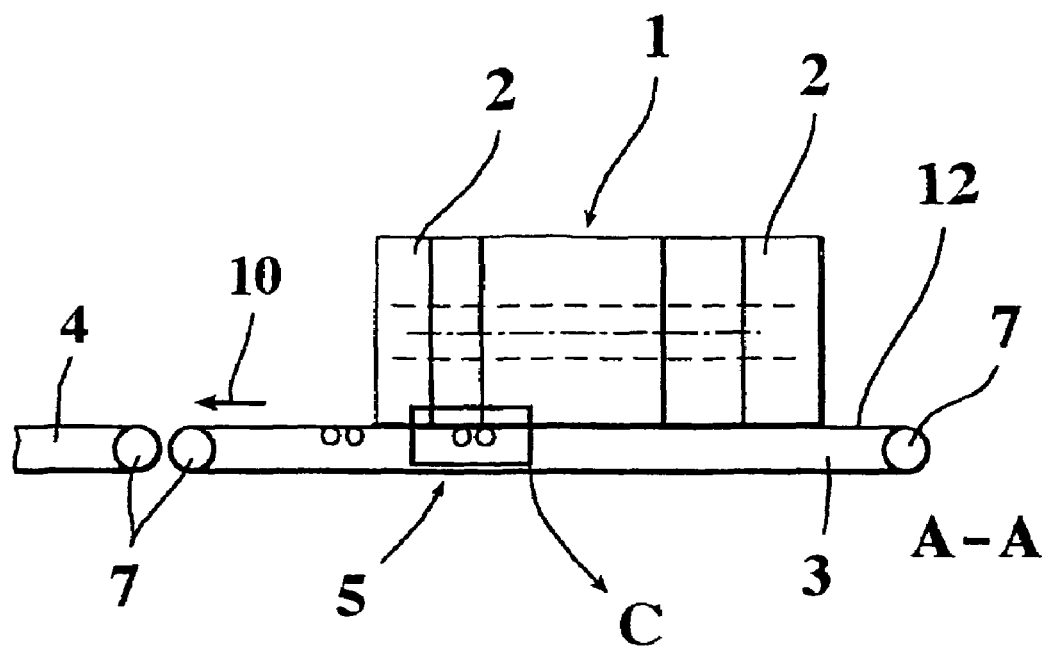
FIG. 2 is a sectional view of FIG. 1 taken along plane A-A.

Referring to FIG. 1, therein is shown the travel of paper or paperboard web rolls 2 of a roll set 1 received from a slitter-winder 11 of paper or paperboard machine as the rolls gravitationally move along a downward ramp 9 until the rolls are stopped onto a conveyor 3 by a stop gage. The rolls of the roll set 1 rest on the conveyor 3 with their ends abutting each other and the center axes aligned in the transport direction of conveyor 3. The transport direction of conveyor 3 is designated by arrow 10 in FIGS. 1 and 2. The rolls 2 have the underside of their circumferential periphery resting against the top surface of the conveyor chain or belt 12 of conveyor 3. After the rolls of roll set 1 are stopped onto conveyor 3, they are separated from each other at the transition point between the conveyor 3 and an other conveyor 4. The separation of rolls 2 from each other takes place by way of moving the set 1 of web rolls on conveyor 3 toward the second conveyor 4 until the abutment plane between the first and second roll of set 1 coincides with the transition point of the conveyor 3 and the other conveyor 4. At this instant, the conveyor 3 is stopped whereby the first roll of set 1 continues its travel on the other conveyor 4. Subsequently, the roll set is moved on the conveyor 3 so that the abutment plane between the second and third roll of the set coincides with the transition point of the first conveyor 3 and the other conveyor 4, whereupon the conveyor 3 is stopped and the second roll of the set continues its travel on the other conveyor 4. The sequence is continued until all the rolls 2 of set 1 are separated from each other.

Figure 3:
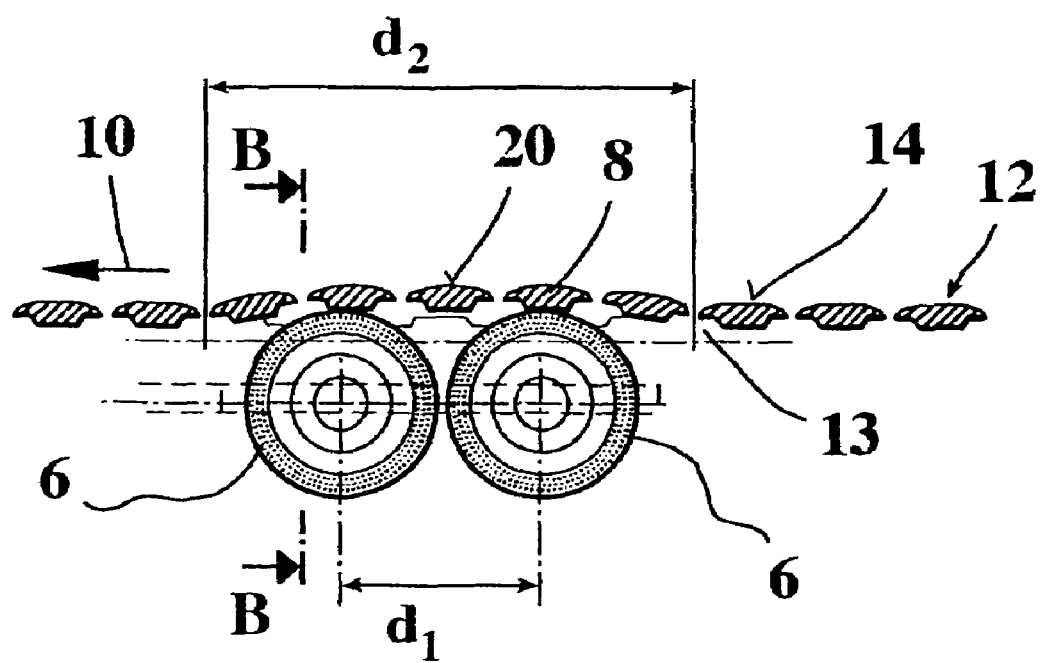
FIG. 3 is a partially enlarged view of FIG. 2 taken at point C having an elevating conveyor roll assembly adapted below the top level of the conveyor chain.
Figure 4:
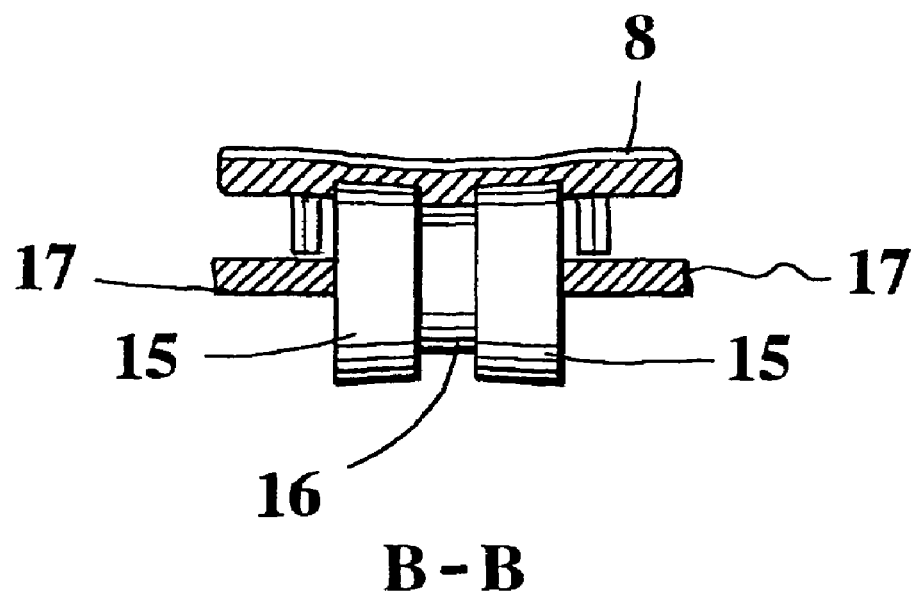
FIG. 4 is a sectional view of FIG. 3 taken along plane B-B.

Typically, conveyor 3 is a slat conveyor. Adapted moving about driving and tail pulleys 7 is an endless conveyor link chain loop 12 comprising two parallel-running lateral chains connected to each other by slats 8, as shown in FIG. 3. In the endless conveyor chain 12, the long sides of the transverse slats 8 are shaped so that recesses 13 remain between the adjacent slats 8. The driving and tail pulleys 7 have teeth adapted to fit between the links of the lateral chains thus facilitating transmission of the driving pulley rotation into a linear motion of conveyor chain 12. As shown in FIG. 4, the slats 8 are slightly shaped in a V-angle thus making the slats 8 when running on the top leg of the conveyor chain to slant downward from the ends of the slat toward the center of the slat.

To separate adhering web rolls 2 of a roll set 1 from each other, conveyor 3 is provided with an elevating roll assembly 5 comprising at least one freely rotating elevating roll 6. Typically, the elevating roll assembly 5 includes two to four elevating rolls 6 adapted to operate in succession along the travel direction 10 of conveyor 3. In a preferred embodiment of the invention illustrated in the drawings, the number of the successive elevating rolls 6 is two.

The elevating roll assembly 5 is adapted between the top leg and bottom leg of the endless loop chain of conveyor 3 so that the top leg of the conveyor chain is elevated at the elevating rolls 6 by a few millimeters, typically 2 to 6 mm, from the base level 14 of the conveyor chain top leg. The outer surfaces of the elevating rolls 6 are covered by an elastic lining such as polyurethane. Each one of the elevating rolls 6 is comprised of two wheels 15 aligned parallel to each other in the travel direction of conveyor 3, the wheels having disposed therebetween a spacer member 16 with a diameter smaller than that of the wheels 15. The spacer member 16 is mounted on the conveyor frame and the wheels are respectively mounted in bearings on the spacer member 16. The elevating roll 6 is placed under the top leg of the endless loop conveyor 3 so that the center point of the top leg of the conveyor chain relative to the lateral dimension of the conveyor chain 12, that is, the center valley point of the V-angled slats 8, coincides with the spacer member 16 and the wheels 15 run symmetrically on both sides of the conveyor chain center line. The peripheral diameters of wheels 15 are tapered toward the conveyor chain center line thus making them more compliant to the V-angled shape of slats 8. The center points of slats 8 do not touch the spacer member 16. To support the top surface of conveyor chain 12, the lateral chains are provided with support wheels 18 that run along rails 17 mounted on the frame of conveyor 3. The support wheels are arranged to operate in two adjacent rows in regard to the travel direction 10 of conveyor 3. Wheels 15 of elevating roll 6 and the spacer member 16 mounted therebetween are adapted between the support wheel rows.

If the number of the elevating rolls 6 is two or more, the mutual distance $d_1$ between the shafts of the successive elevating rolls 6 is about 125 mm. When using, e.g., two elevating rolls 6, this makes the length $d_2$ of the elevation formed by the elevating rolls 6 on the top leg of the conveyor leg to be about 200 mm. The length of the elevation is determined by the number and diameter of the elevating rolls 6, as well as the mutual spacing between the successive elevating rolls. In a conveyor equipped with two elevating rolls 6, the length $d_2$ of the elevation is typically 150 to 200 mm.

Figure 5:
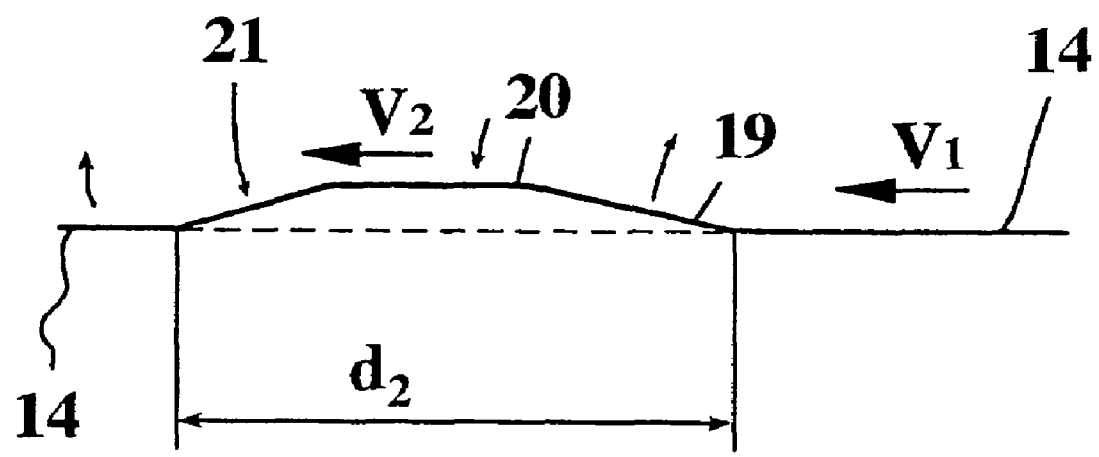
FIG. 5 is a schematic side elevation view of the top level of a conveyor chain or belt at the elevating roll assembly.

The separating motion imposed on the paper web rolls 2 resting on the top leg of the chain of conveyor 3 supported by the elevating roll assembly 5 is illustrated in more detail in FIG. 5. The abutting ends of successive paper web rolls 2 are angled four times in regard to each other as they pass over the elevation formed by the elevating roll assembly 5 on the top leg of the conveyor chain. Each deflection promotes the separation of the paper web rolls 2 from each other. The first deflection occurs when the paper web roll meets the upward-slanting portion 19 of the top leg of conveyor chain 12, while the next following web roll still rests on the base level 14 of the conveyor chain top leg. The second deflection occurs when the paper web roll falls onto conveyor chain portion 20 running on the elevating rolls 6 of the conveyor chain top leg. The web rolls are angled mutually the third time when the web roll falls onto the downward-slanting portion 21 of the conveyor chain. The fourth deflection occurs when the web roll lands onto the conveyor chain base level 14 following the elevating rolls.

In addition to the bending force imposed on the web rolls of a set, the rolls are subjected to a reciprocating up and down movement as the elevating rolls alternatingly sink into the elongated recesses 13 between the adjacent slats 8 and then again hit the projections of the lower surfaces of the slats 8. The travel speed of the chain top leg of conveyor 3 is slightly different on the base level 14 (v1) of the chain top leg as compared to the conveyor speed (v2) on the chain portion 20 running on the elevating rolls 6. Due to the instantaneously faster transport speed of the paper web roll on the chain portion 20 passing over the elevating rolls 6 as compared to the roll transport speed on the conveyor's flat portion, that is, the base level 14 of the conveyor, also this speed difference imparts a separating effect on the adhering web rolls.

The invention may have embodiments different from those described above.

The separating effect can be enhanced by providing the conveyor chain top level with several elevations by adapting plural elevating roll assemblies along the travel length of conveyor 3.

The invention may also be utilized in other types of conveyors. If the conveyor is a belt conveyor or flat slat conveyor having the slats shaped shallower than those of the above-discussed roll conveyor, whereby a sufficiently wide elongated recess is not provided between adjacent slats, the reciprocating up and down motion can be accomplished by means of a suitably designed shape of the elevating rolls 6. To this end, the periphery of the elevating rolls 6 may have, e.g., a polygonal or elliptic shape or, alternatively, the elevating rolls 6 may be adapted to rotate eccentrically.

The spacer members 16 between the elevating rolls 6 may be complemented with actuators allowing the elevation height formed by the elevating rolls 6 to be adjustable during the operation of conveyor 3.

What is claimed is:

1. A method for separating rolls of a roll set traveling on a conveyor from each other, the conveyor comprising a conveyor belt or chain running about driving and tail pulleys, the method comprising:
    transporting the roll set on a top surface of said conveyor belt or chain at a base level in a first section of a transport path between the driving and tail pulleys;
    forming an elevation in a second section of the transport path, the elevation comprising a raised portion of the conveyor belt or chain arriving at the second section of the transport path; and
    separating the rolls from each other when the rolls of the roll set are transported over the elevation by the conveyor belt or chain;
    wherein the elevation is formed with an elevating roll assembly adapted to operate below the top surface of the conveyor belt or chain and comprising at least one rotary elevating roll.

2. The method of claim 1, wherein a height of elevation between the top surface of a base level of the conveyor belt or chain and a top level of the elevation is adjusted during operation of the conveyor, the base level of the conveyor being a level of the conveyor upstream of the elevation.

3. The method of claim 1, wherein at least one of the at least one elevating roll is a polygonal elevating roll.

4. The method of claim 1, wherein at least one of the at least one elevating roll is an elliptic elevating roll.

5. The method of claim 1, wherein at least one of the at least one elevating roll is a roll rotating eccentrically.

6. The method of claim 2, wherein at least one of the at least one elevating roll is a polygonal elevating roll.

7. The method of claim 2, wherein at least one of the at least one elevating roll is an elliptic elevating roll.

8. The method of claim 2, wherein at least one of the at least one elevating roll is a roll rotating eccentrically.

9. A conveyor for transporting and separating rolls of a roll set, comprising:
    a conveyor belt or chain running about driving and tail pulleys, the conveyor belt or chain being configured to support a roll set on a top surface of the conveyor belt or chain at a base level in a first section of a transport path between the driving and tail pulleys; and
    an elevating roll assembly positioned at a second section of the transport path below the conveyor belt or chain, the elevating roll assembly being operable to raise a portion of the top surface of the conveyor belt or chain to form an elevation above the remaining portion of the top surface of the conveyor belt or chain, the elevation being configured to separate the rolls of the roll set from each other when the rolls of the roll set are transported by the conveyor belt or chain over the elevation.

10. The conveyor of claim 9, wherein the elevating roll assembly comprises at least one rotatably mounted elevating roll.

11. The conveyor of claim 10, wherein the elevating roll assembly comprises two elevating rolls adapted to operate in succession along a travel direction of the conveyor.

12. The conveyor of claim 10, wherein the at least one elevating roll is a polygonal elevating roll.

13. The conveyor of claim 10, wherein the at least one elevating roll is an elliptic elevating roll.

14. The conveyor of claim 10, wherein the at least one elevating roll is a roll rotating eccentrically.

15. The conveyor of claim 11, wherein at least one of the elevating rolls is a polygonal elevating roll.

16. The conveyor of claim 11, wherein at least one of the elevating rolls is an elliptic elevating roll.

17. The conveyor of claim 11, wherein at least one of the elevating rolls is a roll rotating eccentrically.

18. The conveyor of claim 9, wherein a height difference between the top surface of a base level of the conveyor belt or chain and the top level of the conveyor elevation is 2 to 6 mm, the base level of the conveyor being a level of the conveyor upstream of the elevation.

19. The conveyor of claim 10, wherein a height difference between the top surface of a base level of the conveyor belt or chain and the top level of the conveyor elevation is 2 to 6 mm, the base level of the conveyor being a level of the conveyor upstream of the elevation.

20. The conveyor of claim 11, wherein a height difference between the top surface of a base level of the conveyor belt or chain and the top level of the conveyor elevation is 2 to 6 mm, the base level of the conveyor being a level of the conveyor upstream of the elevation.

21. The conveyor of claim 9, further comprising a means for adjusting the elevation.

22. The conveyor of claim 10, further comprising a means for adjusting the elevation.

23. The conveyor of claim 9, wherein the elevating roll comprises two wheels and a spacer member, one of the two wheels being on each side of a longitudinal center line of the conveyor belt or chain, the two wheels being rotatably supported with as the spacer member mounted therebetween.

24. The conveyor of claim 10, wherein the elevating roll comprises two wheels and a spacer member, one of the two wheels being on each side of a longitudinal center line of the conveyor belt or chain, the two wheels being rotatably supported with as the spacer member mounted therebetween.

25. The conveyor of claim 9, wherein a length of the elevation in a direction of travel of the conveyor belt or chain is 150 to 250 mm.

26. The conveyor of claim 11, wherein a length of the elevation in a direction of travel of the conveyor belt or chain is 150 to 250 mm.

27. The conveyor of claim 18, wherein a length of the elevation in a direction of travel of the conveyor belt or chain is 150 to 250 mm.

28. The conveyor of claim 19, wherein a length of the elevation in a direction of travel of the conveyor belt or chain is 150 to 250 mm.

29. A method for separating rolls of a roll set, the method comprising:
    transporting the roll set on a conveyor belt or chain along a transport path including an elevation section;
    elevating a portion of the conveyor belt or chain arriving in the elevation section by operating an elevating roll assembly below a top surface of the conveyor belt or chain, the elevating roll assembly comprises at least one rotary elevating roll; and
    separating the rolls from one another when the rolls of a roll set are transported to the elevation section by the conveyor belt or chain.

30. The method of claim 29, further comprising adjusting a height of the elevated portion of the conveyor belt or chain section.

31. The method of claim 29, wherein the at least one rotary elevating roll comprise two rotary elevating rolls adapted to operate in succession along a travel direction of the conveyor belt or chain.

* * * * *